United States Patent
Yen et al.

(10) Patent No.: US 8,655,622 B2
(45) Date of Patent: Feb. 18, 2014

(54) METHOD AND APPARATUS FOR INTERPRETING ORIENTATION INVARIANT MOTION

(75) Inventors: Wei Yen, Seattle, WA (US); Ian Wright, Mountain View, CA (US); Dana Wilkinson, Mountain View, CA (US); Xiaoyuan Tu, Sunnyvale, CA (US); Stuart Reynolds, Mountain View, CA (US); William Robert Powers, III, San Francisco, CA (US); Charles Musick, Jr., Belmont, CA (US); John Funge, Sunnyvale, CA (US)

(73) Assignee: AiLive, Inc., Sunnyvale, CA (US)

( * ) Notice: Subject to any disclaimer, the term of this patent is extended or adjusted under 35 U.S.C. 154(b) by 976 days.

(21) Appl. No.: 12/168,126

(22) Filed: Jul. 5, 2008

(65) Prior Publication Data
US 2010/0004896 A1   Jan. 7, 2010

(51) Int. Cl.
*G01C 9/00*   (2006.01)
*G01C 19/00*   (2013.01)

(52) U.S. Cl.
USPC .................................................. 702/153

(58) Field of Classification Search
USPC ........ 702/141, 142, 150–154; 463/32, 36, 37;
715/700, 757, 858, 863; 345/156, 158,
345/169, 419, 672, 676, 679
See application file for complete search history.

(56) References Cited

U.S. PATENT DOCUMENTS

| | | | |
|---|---|---|---|
| 6,249,606 B1 | 6/2001 | Kiraly et al. | |
| 7,023,536 B2 | 4/2006 | Zhang et al. | |
| 7,038,846 B2 | 5/2006 | Mandella | |
| 7,088,440 B2 | 8/2006 | Buermann et al. | |
| 7,110,100 B2 | 9/2006 | Buermann et al. | |
| 7,113,270 B2 | 9/2006 | Buermann et al. | |
| 7,161,664 B2 | 1/2007 | Buermann et al. | |
| 7,203,384 B2 | 4/2007 | Carl | |
| 7,268,956 B2 | 9/2007 | Mandella | |
| 7,421,369 B2 | 9/2008 | Clarkson | |
| 7,474,809 B2 | 1/2009 | Carl | |
| 7,519,223 B2 | 4/2009 | Dehlin et al. | |
| 7,580,572 B2 | 8/2009 | Bang et al. | |

(Continued)

FOREIGN PATENT DOCUMENTS

EP   457 541   * 11/1991
EP   1834680 A2   9/2007

(Continued)

OTHER PUBLICATIONS

Sven Kratz, et al, "Gesture Recognition Using Motion Estimation on Mobile Phones" *Proc PERMID 07 3rd Intl Workshop on Pervasive Mobile Interaction Devices at Pervasive 2007.*

(Continued)

*Primary Examiner* — Michael Nghiem
(74) *Attorney, Agent, or Firm* — Joe Zheng (57) ABSTRACT

Techniques for interpreting orientation invariant motion are disclosed. Unlike a prior art controller that has a specific physical design to induce or force a user to grip the controller in a consistent way, a disclosed controller does not have such a physical design and allows a user to grip the controller in any way that is comfortable to the user. One or more transformations or rotations are designed to transform or rotate readings from inertial sensors housed in the controller to readings independent from how the controller is being gripped by a user.

35 Claims, 4 Drawing Sheets

(56) References Cited

U.S. PATENT DOCUMENTS

| | | | |
|---|---|---|---|
| 7,636,645 B1* | 12/2009 | Yen et al. | 702/152 |
| 7,702,608 B1* | 4/2010 | Bererton et al. | 706/46 |
| 7,729,515 B2 | 6/2010 | Mandella et al. | |
| 7,770,136 B2 | 8/2010 | Beeck et al. | |
| 7,774,155 B2 | 8/2010 | Sato et al. | |
| 7,826,641 B2 | 11/2010 | Mandella et al. | |
| 7,961,909 B2 | 6/2011 | Mandella et al. | |
| 2002/0072418 A1* | 6/2002 | Masuyama et al. | 463/43 |
| 2004/0030531 A1 | 2/2004 | Miller et al. | |
| 2005/0215322 A1 | 9/2005 | Himoto et al. | |
| 2005/0219213 A1 | 10/2005 | Cho et al. | |
| 2006/0017692 A1* | 1/2006 | Wehrenberg et al. | 345/156 |
| 2006/0071904 A1 | 4/2006 | Cho et al. | |
| 2006/0279549 A1 | 12/2006 | Zhang et al. | |
| 2006/0287084 A1 | 12/2006 | Mao et al. | |
| 2007/0213127 A1* | 9/2007 | Sato | 463/36 |
| 2008/0158155 A1* | 7/2008 | Liberty et al. | 345/158 |
| 2008/0174550 A1* | 7/2008 | Laurila et al. | 345/158 |
| 2009/0066641 A1 | 3/2009 | Mahajan et al. | |
| 2009/0143141 A1 | 6/2009 | Wells et al. | |
| 2009/0149257 A1 | 6/2009 | Ferguson et al. | |
| 2009/0209343 A1 | 8/2009 | Foxlin et al. | |
| 2009/0258703 A1 | 10/2009 | Brunstetter | |
| 2009/0265671 A1 | 10/2009 | Sachs et al. | |
| 2009/0273559 A1 | 11/2009 | Rofougaran et al. | |
| 2009/0291759 A1 | 11/2009 | Cox et al. | |
| 2010/0035688 A1 | 2/2010 | Picunko | |
| 2010/0079447 A1 | 4/2010 | Williams | |
| 2010/0088061 A1 | 4/2010 | Horodezky et al. | |
| 2010/0113153 A1* | 5/2010 | Yen et al. | 463/37 |
| 2010/0117959 A1 | 5/2010 | Hong et al. | |
| 2010/0171696 A1 | 7/2010 | Wu | |
| 2010/0201616 A1 | 8/2010 | Choi et al. | |

FOREIGN PATENT DOCUMENTS

| | | |
|---|---|---|
| EP | 2090346 A1 | 8/2009 |
| GB | 2423808 | 9/2006 |
| JP | 11253656 | 9/1999 |
| WO | WO2006/090197 | 8/2006 |
| WO | WO2006/128093 | 11/2006 |

OTHER PUBLICATIONS

E. Keogh and M. Pazzani, Derivative Dynamic Time Warping, in First SIAM International Conference on Data Mining, (Chicago, IL, 2001).

Lawrence R. Rabiner, A Tutorial on Hidden Markov Models and Selected Applications in Speech Recognition. Proceedings of the IEEE, 77 (2), p. 257-286, Feb. 1989.

"Radar, Sonar, Navigation & Avionics Strapdown Inertial Navigation Technology, $2^{nd}$ Edition", by D. Titterton and J. Weston, 2004.

"Design and Error Analysis of Accelerometer-Based Inertial Navigation Systems", Chin-Woo Tan et al., Published in Jun. 2002 by the University of California at Berkeley for the State of California PATH Transit and Highway System.

Foley et al "Computer Graphics, principles and practice", $2^{nd}$ Ed. The Systems Programs Series, Addison-Wesley Publishing Company, ISBN0-201-I2It 0-7, 1990.

R. Kjeldson and J. Kender, Towards the Use of Gesture in Traditional User Interfaces, Proceedings of the $2^{nd}$ International Conference on Automatic Face and Gesture Recognition) 1996.

D. Kwon and M. Gross, Combining Body Sensors and Visual Sensors for Motion Training, ACM SIGCHI ACE 2005.

Liqun Deng et al, "Automated Recognition of Sequential Patterns in Captured Motion Streams", WAIM 2010, LNCS 6184, pp. 250-261, 2010.

M. Roth, K. Tanaka, "Computer Vision for Interactive Computer Graphics", TR99-02 Jan. 1999, *IEEE Computer Graphics and Applications*, May-Jun. 1998, pp. 42-53.

YK Jung, et al, "Gesture recognition based on motion inertial sensors for ubiquitous interactive game content", *IETE Technical review*, vol. 27, Issue 2, Mar.-Apr. 2010.

Zhang Xu et al, "Hand Gesture Recognition and Virtual Game Control Based on 3D Accelerometer and EMG Sensors", *IUI'09*, Feb. 8-11, 2009, Sanibel Island, Florida, USA.

Greg Welch, et al, "Motion Tracking: No Silver Bullet, but a Respectable Arsenal", Motion Tracking Survey, Nov./Dec. 2002.

Axel Mulder, et al, "Human movement tracking technology", Human Movement Tracking Technology. Technical Report, NSERC Hand Centered Studies of Human Movement project, available through anonymous ftp in fas.sfu.ca:/pub/cs/graphics/vmi/HMTT.pub.ps.Z. Burnaby, B.C., Canada: Simon Fraser University, Jul. 1994.

Sven Kratz, et al, "Gesture Recognition Using Motion Estimation on Mobile Phones" *Proc. PERMID 07 3rd Intl Workshop on Pervasive Mobile Interaction Devices at Pervasive 2007*.

Chuck Blanchard, et al, "Reality Built for Two: A Virtual Reality Too I" VPL Research, Inc . 656 Bair Island Road, Suite 30 4, Redwood City, CA 9406 3, I3D '90 Proceedings of the 1990 symposium on Interactive 3D graphics, © 1990 table of contents ISBN:0-89791-351-5.

NamHo Kim. et al "Gesture Recognition Based on Neural Networks for Dance Game Contents", 2009 International Conference on New Trends in Information and Service Science.

Xiaoxu Zhou, et al "Real-time Facial Expression Recognition in the Interactive Game Based on Embedded Hidden Markov Model", Proceedings of the International Conference on Computer Graphics, Imaging and Visualization (CGIV'04), 2004.

U.S. Appl. No. 10/769,484, filed Jan. 30, 2004, Carl.
U.S. Appl. No. 13/134,006, filed May 25, 2011, Mandella , et al.
U.S. Appl. No. 13/199,239, filed Aug. 22, 2011, Mandella , et al.

* cited by examiner

METHOD AND APPARATUS FOR INTERPRETING ORIENTATION INVARIANT MOTION

BACKGROUND OF THE INVENTION

1. Field of Invention

The invention generally relates to the area of controlling devices, and more particularly related to motion-sensitive controlling devices with the abilities of interpreting orientation invariant motion.

2. Related Art

The Nintendo Wii Remote™ wireless controller is an example of the most recent state of the art advances in user interactive controllers for computer display game systems. It is a movable wireless remote controller hand-held by a user. It uses a combination of built-in accelerometers and infrared detection to sense its position in a 3D space when pointed at LEDs within the reach of a sensor bar. This design allows users to control a game using physical gestures as well as traditional button presses. The controller connects to a console using Bluetooth and features rumble as well as an internal speaker. As a user moves the controller in reacting to a display, the controller transmits motion data to the console via conventional short range wireless RF transmissions to simulate interactions of the users with the game being displayed. The detail on such a type of controllers is described in Published U.S. Application US2007/0060384, which is hereby incorporated by reference.

One restriction in using such a controller is that a user has to hold the controller in a particular way so that physical gestures of the user could be reasonably interpreted. To enforce such holding patterns, the controller is designed in an elongated rectangular shape with most buttons on one side and a trigger on the other side such that a natural grip of the controller by a user orients the controller in a consistent way in his/her hand while other grips feel uncomfortable or do not provide ready access to the buttons or trigger. Consistent grips of the controller result in relatively consistent data from the internal accelerometers when a particular motion is made.

In reality or other applications, controllers may come in different physical designs. Users prefer to have a certain degree of freedom to hold a controller. As a result, the physical design of a controller may not lead a user to hold the controller in a consistent way. Examples include a controller whose physical form is essentially cylindrical—motion sensitive controllers in the shape of magic wands, "light-sabers", microphones, swords, whips, drum-sticks, batons and so on. In each case, a natural grip of such a controller lends no preference of orientation of the internal motion sensors about the length of the controller. Because identical motions of differently oriented controllers result in different motion sensor readings, the task of interpreting the readings for many applications is more difficult. In addition, it is problematic for systems (such as LiveMove) that interpret the readings from a controller and determine the type of motion that was made. Moves such as whip, upper-cut, thrust, fore-hand, back-hand, are examples of types of motions that can be differentiated through the data generated by a motion sensitive controller in order to allow a user to affect control over an in-game avatar. In cases where there is no preference of orientation of the controller in the user's grip, it is desirable for such systems to be able to cope with the data generated by the various possible grips.

SUMMARY OF THE INVENTION

This section is for the purpose of summarizing some aspects of the present invention and to briefly introduce some preferred embodiments. Simplifications or omissions in this section as well as in the abstract may be made to avoid obscuring the purpose of this section and the abstract. Such simplifications or omissions are not intended to limit the scope of the present invention.

The present invention generally pertains to motion-sensitive controlling devices with the abilities of interpreting orientation invariant motion. The devices may be used in applications of controlling another device, a system, one or more avatars or animations. According to one aspect of the present invention, it is assumed that a controller can be gripped in any way around an axis z, one or more transformation or rotations are designed to transform or rotate readings from inertial sensors housed in the controller to readings independent from how the controller is being gripped by a user.

According to another aspect of the present invention, unlike a prior art controller (e.g., a WII game controller) that has a specific physical design to induce or force a user to grip the controller in a consistent way, the controller designed in accordance with the present invention does not have such a specific design and allows a user to grip the controller in any way that is comfortable to the user. Depending on implementation, the controller may be designed to be substantially rotationally symmetrical about at least one axis and can be gripped naturally in any orientation around such an axis.

According to still another aspect of the present invention, the readings from the inertial sensors are transformed in such a way that any given motion made with a controller with one grip results in the same or similar data when the same motions are made with a different grip. This transformation retains information within the data that is sufficient to allow various types of motion to be differentiated by a system observing the transformed data (such as LiveMove).

According to yet another aspect of the present invention, there are at least two processes involved to map original actual readings to readings that are independent of how the grip is being gripped: (i) orientation correction and (ii) calibration for any fixed grip by rotation to a reference grip or calibration for any grip by rotation to a direction of initial impulse, each may be executed independently or collaboratively.

Depending on implementation, the present invention may be implemented as a method, an apparatus or part of a system. According to one embodiment, the present invention is a method comprising: receiving one or more sets of reference readings; receiving sets of readings over a time period from a set of inertial sensors housed in a handheld device gripped by a user in one of many possible orientations as the handheld device is being moved from one location to another location in a 3-dimensional space; computing a set of rotations; and rotating at least some of each of the sets of readings or at least some of the reference readings via one of the rotations in such a way that the sets of readings are substantially independent of how the handheld device is gripped. As used herein, a location of an object may include a position and/or an orientation of the object in a 3D space.

According to another embodiment, the present invention is a controller comprising: a housing having an exterior design that allows a user to grip the controller in any way the user prefers, resulting in many possible orientations as the controller is being moved from one location to another location in a 3-dimensional space, a set of inertial sensors housed in the controller, wherein sets of readings over a time period from the inertial sensors are obtained, and at least some of each of the sets of readings or at least some of reference readings are rotated by one of rotations in such a way that the sets of readings are substantially independent of how the controller is gripped.

Other objects, features, benefits and advantages, together with the foregoing, are attained in the exercise of the invention in the following description and resulting in the embodiment illustrated in the accompanying drawings.

BRIEF DESCRIPTION OF THE FIGURES

These and other features, aspects, and advantages of the present invention will be better understood with regard to the following description, appended claims, and accompanying drawings where:

DETAILED DESCRIPTION OF THE INVENTION

The detailed description of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1:
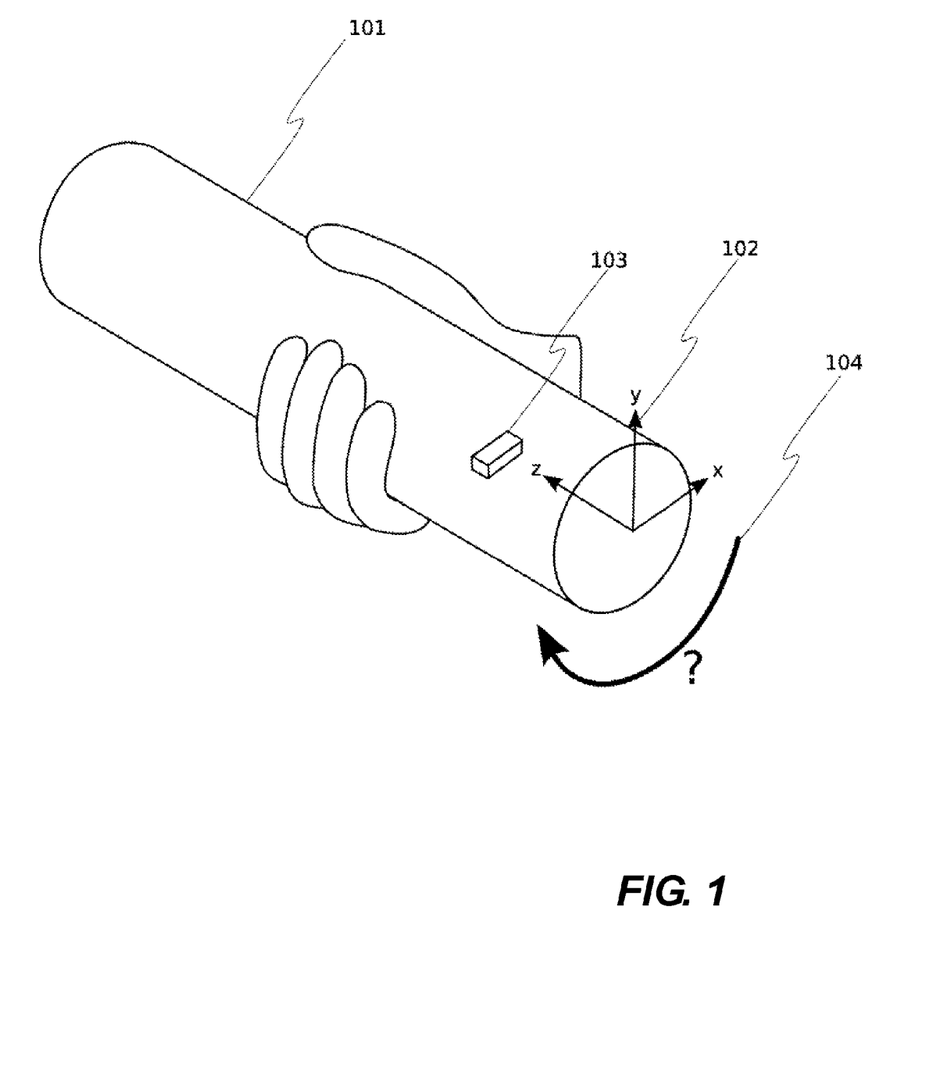
FIG. 1 shows a cylindrical motion sensitive controller 101 in accordance with one embodiment of the present invention.

Referring now to the drawings, in which like numerals refer to like parts throughout the several views. FIG. 1 shows a cylindrical motion sensitive controller 101 in accordance with one embodiment of the present invention. Compared with the current Wii controller, the controller 101 does not have a physical design that implicitly induce a user to grip it in a consistent way. In other words, a natural grip of the controller 101 lends no preference of the orientation 104 of internal motion sensors 103 in the controller 101 with respect to a 3D space 102. Similar to the current Wii controller, the controller 101 includes three accelerometers 103 for measuring acceleration and gravity in induced reaction forces, although it possibly includes other motion sensors to detect a complete set of data used to derive six relative linear and angular motions of the controller.

Depending on implementation, the controller 101 may be a stand-alone controlling device, or part of another device (e.g., a mobile, phone a magic wand, a light-saber, a microphone, a sword, a whip, a drum-stick, or a baton). One of the unique features is that the controller 101 could be positioned in any way that may fit in a user's hand or an accompanying device, but the final orientation is determined regardless of the initial orientation of the controller 101. Accordingly, there is no requirement to position the controller 101 in a consistent way with respect to a 3D world (e.g. 3D Cartesian coordinate space).

To facilitate the understanding of the present invention, the orientation of the controller 101 is denoted by its axes (x,y,z) 102. The three accelerometers 103 in the controller 101 are each aligned to sense a motion along one of these axes 102. Because the accelerometers 103 are sensitive to gravity, their readings vary when the controller 101 is oriented variously with respect to the direction of gravity. In an actual operation of the controller 101 over a time period, sets of the readings from the sensors are produced after the controller 101 has been stationary for some time and when it is detected to have a sudden move or after an event.

It is assumed, at time t, three accelerometer readings are produced and expressed in a vector $a=(a_x, a_y, a_z)$. The orientation of the controller 101 around its z-axis is unknown. One of the features, advantageous and benefits in the present invention is a mechanism that is configured to transform or rotate the readings in such a way that the performance of a given motion yields the same data as if the controller 101 is gripped in a defined way (reference orientation), regardless of the initial orientation thereof about the axis z.

According to one embodiment, transforming the readings involves at least two processes: (i) orientation correction and (ii) calibration for any fixed grip by rotation to a reference grip, or calibration for any grip by rotation to a direction of initial impulse. The processes may be implemented in software, hardware or in a combination of both. The processes may be distributed and executed in a controller and a console via a wireless communication means, or completely executed in a controller or a console where the readings from the controller are transported to the console via a wireless communication means.

In operation, a set of reference readings is obtained. In one embodiment, the reference readings are obtained from the sensors after the controller has been relatively stationary for some time, and/or when it is detected to have a sudden move. Alternatively, some of the reference readings may be obtained from the sensors (e.g., an accelerometer, a gyroscope or a magnetic field sensor) in the controller and others from other means such as being predefined or obtained from other sensors or devices not included in the controller. Examples of other sensors or devices include a camera, an infra-red sensor, an optical recognizer, a sonic device, an electromagnetic field sensor, a device capable of determining information from triangulation. After the reference readings are obtained, actual readings from the sensor in the controller are obtained over a time to recognize the motion of the controller or a trajectory of the controller. To facilitate the description of the present invention, unless otherwise specifically stated, readings used below may indicate the reference readings from or not from the sensors in the controller, or the actual readings from the sensors in the controller after an event (e.g., a period or quiescence, a sudden move or an initial impulsive status).

Orientation correction: respective components of the readings or data from the sensors are rotated via a transformation so that the transformed readings from the controller 101 would become the readings as if they are read off from the controller positioned in a reference orientation, or -substantially invariant to the orientation of the user's grip.

This is achieved by projecting original readings a onto basis axes $[R_1, R_2]$ via a transformation matrix $R=[R_1, R_2]$ to obtain new transformed readings, $a'=(a'_x, a'_y, a'_z)$ as follows:

$$a'_x = R_1 \cdot (a_x, a_y)$$

$$a'_y = R_2 \cdot (a_x, a_y)$$

$$a'_z = a_z$$

The choice of R affects the amount of rotation of the data about z. R is constrained such that the only possible transformation allowed is a rotation as follows:

$$R_1 = (c, d)$$

$$R_2 = (-d, c)$$

$$|R_1| = 1$$

$$|R_2| = 1$$

for some values c and d.

Figure 2:
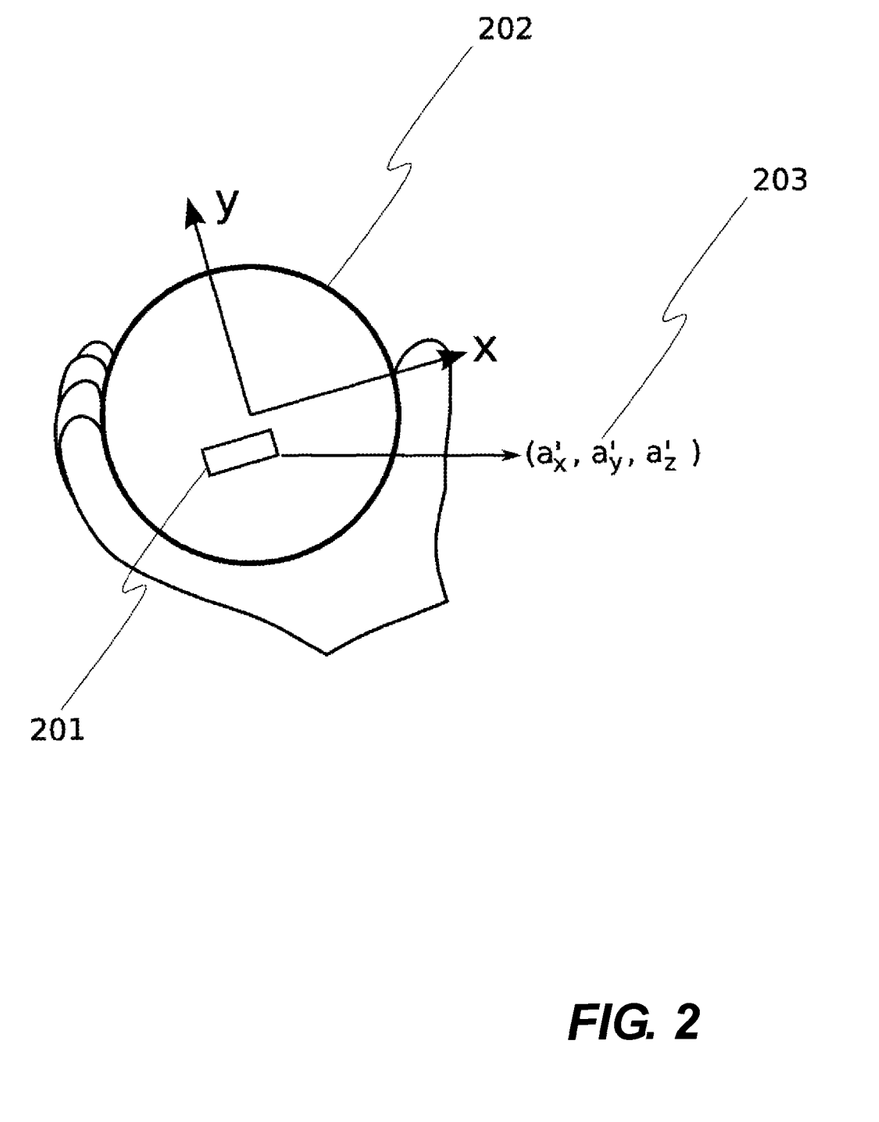
FIG. 2 shows sensors 201 mounted in a controller 202 held in a reference grip to generate reference readings 203.
Figure 3:
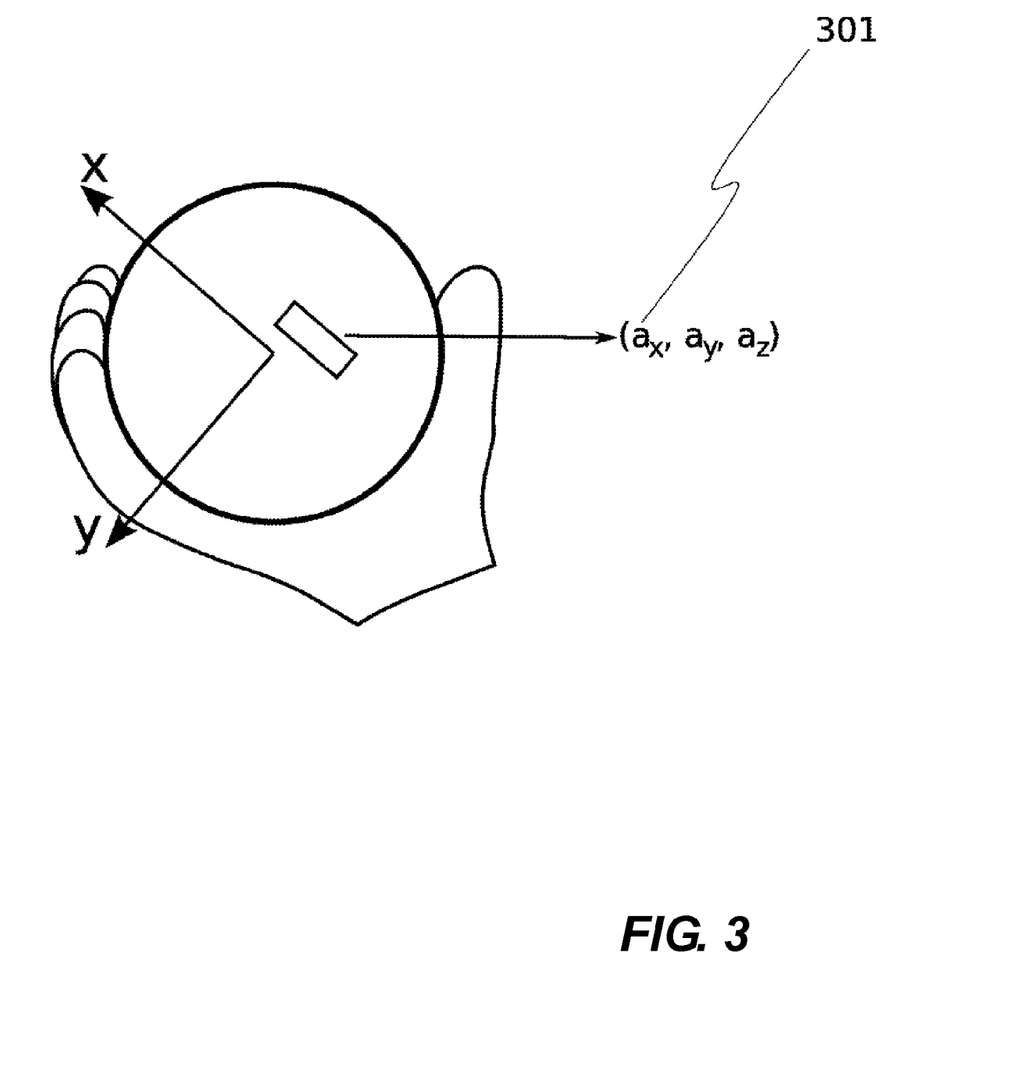
FIG. 3 shows calibration readings 301 output due to a controller with unknown orientation about its z-axis.

Calibration for any fixed grip by rotation to a reference grip: if in the above equations:
- a' is substituted for readings obtained from a reference orientation of the controller (e.g. held horizontally with any rotation about axis z, as shown in FIG. 2, and,
- a is for readings obtained when the user is asked to grip the controller in the same way as the reference (also held horizontally but with another unknown orientation about axis z, as in FIG. 3), and, the equations are solved for c and d, then values for |R| have been specified such that readings for motions obtained in the user grip are transformed into the readings that would have been observed if the same motion had been made by a controller gripped in the reference orientation.

According to another embodiment, the orientation correction is implemented by a rotation of any grip to direction of initial impulse. If a user changes his grip, or moves the controller into his other hand or passes it to another person, then the new grip may have the controller oriented differently about its z-axis. Recalibration is therefore required.

It is not generally possible, by inspection of the readings, to detect when the grip has changed, nor is it desirable to frequently require the user to repeat the calibration step after changes in grip. To resolve this, the calibration may be performed immediately at the start of a motion. To do this:

1. define the readings $a^I = (a^I_x, a^I_y, a^I_z)$ to be those received at the start of the motion. The start of a motion may be defined in various ways, such as by detecting a significant change $a^I_x$, or $a^I_y$. In case where readings are noisy, $a^I$ should be an average of the initial readings.

2. Define:

$$R_1 = (a^I_x, a^I_y) / |(a^I_x, a^I_y)|$$

$$R_2 = (-a^I_y, a^I_x) / |(a^I_x, a^I_y)|$$

then R rotates the motion data by an amount determined by the direction of the impulse of the start of the motion.

Figure 4:
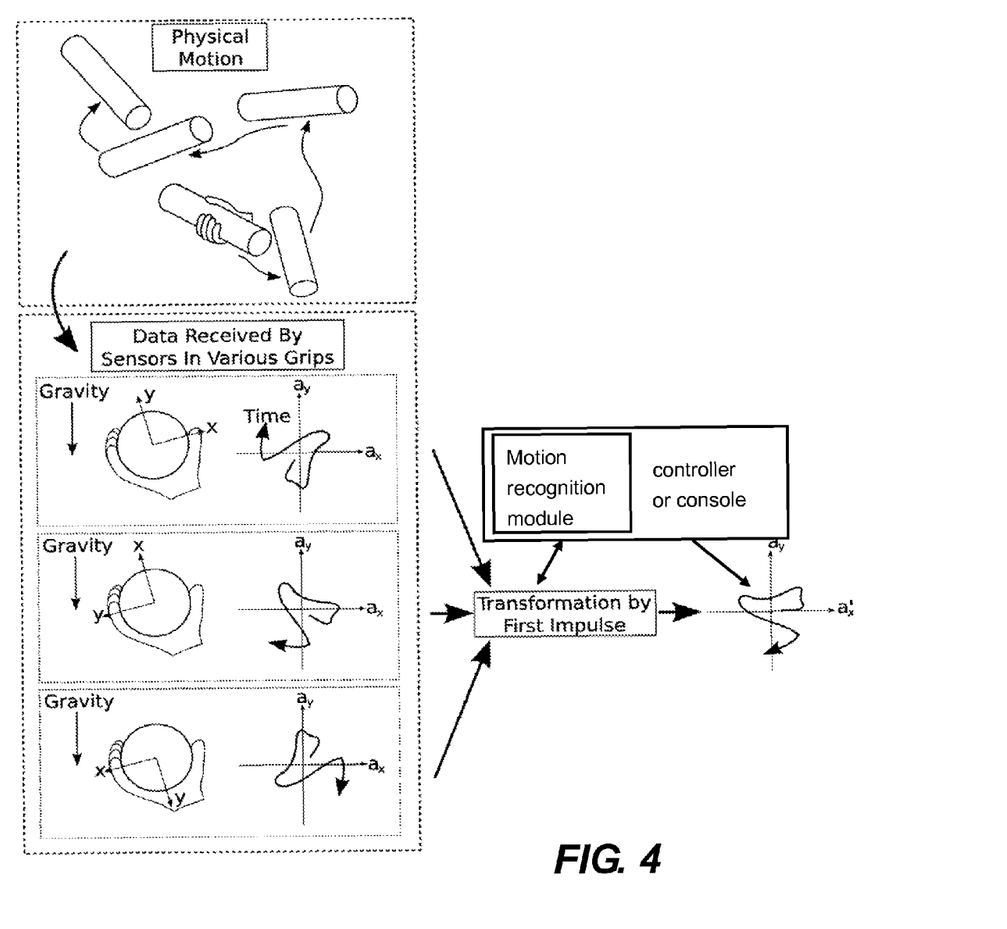
FIG. 4 shows an illustrative example of the transformation by first impulse method on data produced by identical motions of a controller held with varying grips.

Future readings are rotated in the x-y plane to align with this initial impulse in motion readings. As a result, the transformed readings are invariant to the direction of the initial impulse in the controller's x-y plane and so also invariant to the orientation of the controller about its z-axis. FIG. 4 shows that three possible grips of a controller that may vary depending on how a user holds it. Through the transformation, data differences in the same motions are due to variations in users' grips are removed. No explicit calibration step is required by the user.

Once the readings from the sensors are rotated to become independent from the initial orientation of the controller, the rotated readings may be used to find how the controller has been moved since one or more sets of the reference readings are taken. A motion recognition module is configured to perform the determination of the type of movement of the controller. The motion recognition module may be implemented in the controller or a base computer (e.g., a console). According to one embodiment, a set of example motions is provided. Upon receiving the rotated readings, the motion recognition module is activated to determine the type of movement of the controller. Machine learning techniques that may be implemented in the motion recognition module are used to automatically generate one or more motion recognizers from the example motions.

In another embodiment, those motion recognizers can be incorporated into an end-user application with the effect that when the application provides a motion (e.g., readings from the sensors in the controller), those motion recognizers can recognize the motion and label it as an example of one of the known classes of motion. In the case that the motion is not an example of a known class of motion, those motion recognizers can collectively recognize the fact by responding that the motion is labeled "unknown" or selecting a label corresponding to one of the known classes of motion closest to the motion being determined.

Further details on the motion recognition module can be found in co-pending and commonly owned U.S. application Ser. No. 11/486,997, now U.S. Pat. No. 7,702,608, which is hereby incorporated by reference. It can be appreciated that one of the important features in the present invention is that the motion recognition result is substantially independent of how the handheld device is being gripped as the data or the readings from the sensors in the controller are rotated first before being applied to the motion recognition module.

As the readings from the sensors are taken over a time, and the corresponding movements are derived so that a trajectory of the controller may be derived. Similarly, the trajectory is substantially independent of how the handheld device is being gripped.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. While the embodiments discussed herein may appear to include some limitations as to the presentation of the information units, in terms of the format and arrangement, the invention has applicability well beyond such embodiment, which can be appreciated by those skilled in the art. Accordingly, the scope of the present invention is defined by the appended claims rather than the forgoing description of embodiments.

We claim:

1. A method for interpreting orientation invariant motion using a computing unit, the method comprising:
   receiving one or more sets of reference readings;
   receiving sets of readings over a time period from a set of inertial sensors housed in a handheld device gripped by a user in one of many orientations as the handheld device is being moved from one location to another location in a 3-dimensional space;
   computing a set of rotations of the handheld device from the sets of readings;
   computing a representation of a movement of the handheld device from the sets of readings, the set of rotations, and the one or more sets of reference readings, wherein the computing of the representation of the movement includes at least one of: rotating at least some of the sets of readings, rotating at least some of the reference readings, partially rotating at least some of the sets of readings and partially rotating at least some of the reference readings to readings that are substantially independent of how the handheld device is gripped; and wherein the reference readings include first and second sets of data, the first set of data is determined from a vector field and pertains to an initial orientation of the handheld device gripped in accordance with a reference grip, and the second set of data is determined from the vector field as the handheld device is gripped by a different user with a different grip, and the representation of the movement is substantially independent of how the handheld device is gripped and the reference readings are taken when the handheld device is detected to have a sudden move.

2. The method as recited in claim 1, wherein the reference readings pertain to an initial direction of the sudden move of the handheld device.

3. The method as recited in claim 2, wherein subsequent readings from the inertial sensors are sampled to be the sets of readings, and the reference readings are taken again after the handheld device has been relatively stationary and is detected to have another sudden move.

4. The method as recited in claim 1, wherein at least one element of the reference readings is determined externally, not from the inertial sensors.

5. The method as recited in claim 1, wherein either one or all of the first and second data are taken again after the handheld device has been relatively stationary for a predefined time.

6. The method as recited in claim 1, wherein the vector field is from gravity or a magnetic field.

7. The method as recited in claim 1, wherein said computing a set of rotations includes comparing the first and second sets of data to derive the set of rotations required to rotate the first set of data to be substantially coincident with the second set of data.

8. The method as recited in claim 1, wherein said computing a set of rotations includes calculating the rotations required to rotate the first and second sets of data to be substantially coincident with a first configuration different from a second configuration corresponding to either one of the first and second sets of data.

9. The method as recited in claim 1, wherein the inertial sensors include at least one of an accelerometer, a gyroscope or a magnetic field sensor.

10. The method as recited in claim 1, wherein the inertial sensors include a camera, an infra-red sensor, an optical recognizer, a sonic device, an electromagnetic field sensor, or a device capable of determining information from triangulation.

11. The method as recited in claim 1, further comprising:
providing a motion recognition module configured to derive a type of motion of the handheld device since one or more sets of the reference readings have been taken; and
generating a motion recognition result from the motion recognition module to assign a predefined label, wherein the motion recognition result is substantially independent of how the handheld device was gripped.

12. The method as recited in claim 1, further comprising:
deriving a trajectory of the handheld device; and
tracking relative changes in positions and orientations of the handheld device that are substantially independent of how the handheld device is being gripped.

13. The method as recited in claim 1, wherein the handheld device does not have a particular physical design that indirectly induces a user to grip the handheld device in a particular way.

14. The method as recited in claim 13, wherein the handheld device is a standalone controller to be gripped in any way that is comfortable to the user.

15. The method as recited in claim 13, wherein the handheld device is part of another portable device.

16. The method as recited in claim 15, wherein the portable device is one of a mobile phone, a magic wand, a light-saber, a microphone, a sword, a whip, a drum-stick, or a baton.

17. The method as recited in claim 13, wherein the handheld device is substantially rotationally symmetrical about at least an axis and to be gripped naturally in any orientation about the axis.

18. The method as recited in claim 17 wherein the device is substantially cylindrical or spherical, and to be gripped naturally in any orientation around an axis.

19. A controller comprising:
a housing having an exterior design that allows a user to grip the controller in any way the user prefers, resulting in many orientations as the controller is being moved from one location to another location in a 3-dimensional space; and
a set of inertial sensors housed in the controller, wherein sets of readings over a time period from the inertial sensors are obtained, and at least some of the sets of readings or at least some of reference readings are rotated to readings that are substantially independent of how the controller is gripped to compute a representation of a movement of the controller, and wherein the movement of the controller is substantially independent of how the controller is gripped, and the reference readings are taken when the controller is detected to have a sudden move, and the reference readings include first and second sets of data, the first set of data is determined from a vector field and pertains to an initial orientation of the controller gripped in accordance with a reference grip, and the second set of data is determined from the vector field as the controller is gripped by a different user with a different grip.

20. The controller as recited in claim 19, wherein the reference readings pertain to an initial direction of the sudden move of the controller.

21. The controller as recited in claim 20, wherein subsequent readings from the inertial sensors are sampled to be the sets of readings, and the reference readings are taken again after the controller has been relatively stationary and is detected to have another sudden move.

22. The controller as recited in claim 19, wherein at least one element of the reference readings is determined externally, not from the inertial sensors.

23. The controller as recited in claim 19, wherein either one or all of the first and second data are taken again after the controller has been relatively stationary for a predefined time.

24. The controller as recited in claim 19, wherein the vector field is from gravity or a magnetic field.

25. The controller as recited in claim 19, wherein each of the rotations is determined by comparing the first and second sets of data to rotate the first set of data to be substantially coincident with the second set of data.

26. The controller as recited in claim 19, wherein each of the rotations is determined by calculating the rotations required to rotate the first and second sets of data to be substantially coincident with a first configuration different from a second configuration corresponding to either one of the first and second sets of data.

27. The controller as recited in claim 19, wherein the inertial sensors include at least one of an accelerometer, a gyroscope or a magnetic field sensor.

28. The controller as recited in claim 19, wherein the inertial sensors include a camera, an infra-red sensor, an optical recognizer, a sonic device, an electromagnetic field sensor, or a device capable of determining information from triangulation.

29. The controller as recited in claim 19, wherein the controller is configured to work with a motion recognition module configured to derive how the controller has been moved since the reference readings are taken; and a motion recognition result from the motion recognition module is used to match a predefined label, wherein the motion recognition result is substantially independent of how the controller is being gripped.

30. The controller as recited in claim 19, wherein the controller is configured to work with a motion recognition module to derive a trajectory of the controller and track relative changes in positions and orientations of the controller that are substantially independent of how the controller is being gripped.

31. The controller as recited in claim 19, wherein the controller is a standalone game controller to be gripped in any way that is comfortable to the user.

32. The controller as recited in claim 31, wherein the controller is part of another portable device.

33. The controller as recited in claim 32, wherein the portable device is one of a mobile phone, a magic wand, a light-saber, a microphone, a sword, a whip, a drum-stick, or a baton.

34. The controller as recited in claim 19, wherein the controller is substantially rotationally symmetrical about at least an axis and to be gripped naturally in any orientation about the axis.

35. The method as recited in claim 19 wherein the controller is substantially cylindrical or spherical, and to be gripped naturally in any orientation around an axis.

* * * * *